Patented Oct. 20, 1931

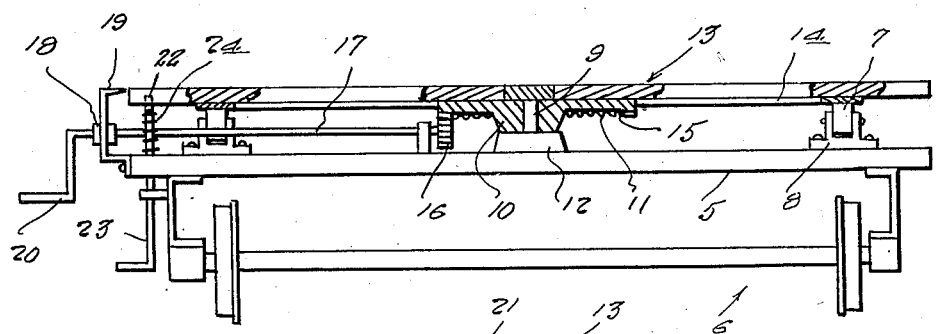
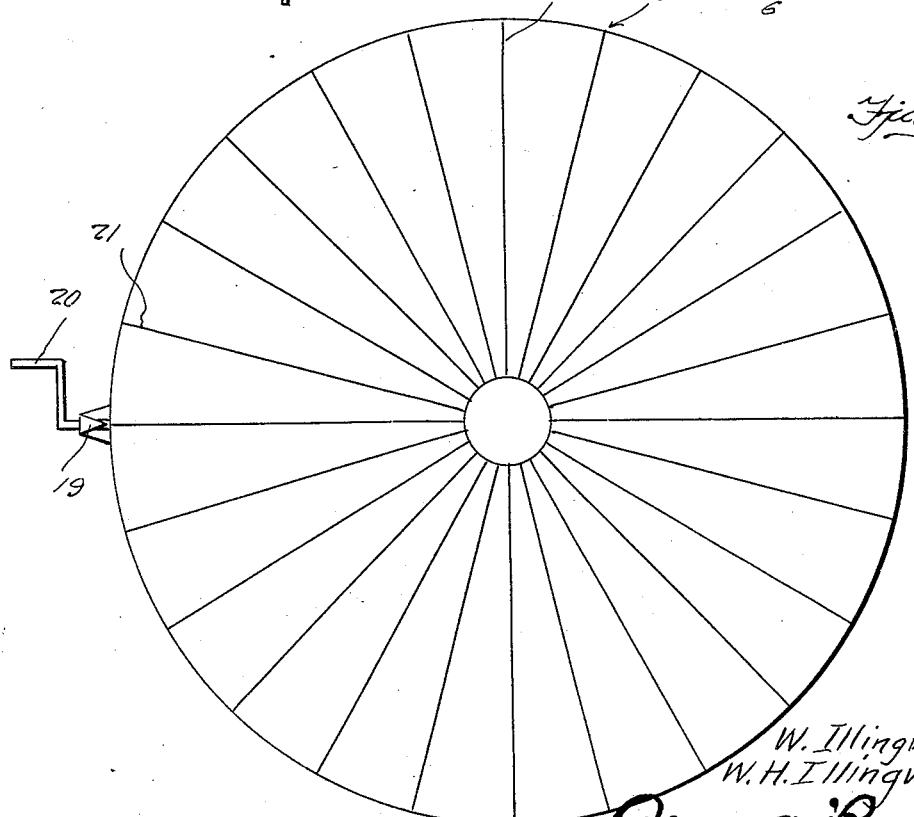

1,828,414

UNITED STATES PATENT OFFICE

WILLIAM ILLINGWORTH AND WILLIAM HENRY ILLINGWORTH, OF SCARBOROUGH, ONTARIO, CANADA

TURNTABLE

Application filed May 10, 1930. Serial No. 451,396.

This invention relates to a structure which may be broadly referred to as a turn table, and it has more particular reference to a construction which is provided to provide an added accessory for use on stone and marble sawing machinery and the like.

In many of the stone yards and analogous marble plants, the wheel supported trucks are provided for aiding in the handling and transportation, sawing and conditioning of stones for commercial purposes.

At the present time, it is necessary to employ derricks and lifting machinery in conjunction with the trucks, to the utilization of crow bars and other makeshift devices in shifting and placing the relatively large stone slabs on the truck in such a manner as to aid in sawing and straightening ends, etc.

Due to the excessive weight of these stone slabs, much time and patience is lost in attempting to promote sawing conditions and as a result the sawed work is generally inaccurate and frequently regarded as unfit for marketing and exploitation purposes.

Having experienced difficulties in this particular line of industry and having noted the objections accompanying the cumbersome working appliances now employed for sawing purposes on trucks and the like, we have evolved and produced a simple and efficient turntable which is mounted on the truck in such a position as to permit the work to be arranged thereon and then readily moved to the desired position for sawing and finishing purposes.

Briefly stated, the invention comprises a flat disk-like graduated table on which the work is placed, an index or pointer cooperating with the graduations, means for rotatably mounting the turn table on the truck, and gearing for turning the table slowly to place the work in proper position for accurate adjustment of the saws.

In the drawings:—

Figure 1 is a view in section and elevation showing the turn table constructed in accordance with the present invention.

Fig. 2 is a top plan view of the turn table.

In the drawings in Fig. 1, the body of the truck is indicated by the numeral 5 and 6 represents the wheeled axle structure. In accordance with the present invention, we provide a plurality of brackets on the trucks and arrange these at circumferentially spaced points, each bracket being provided with an anti-friction roller 7.

Incidentally the brackets 8 are of any appropriate form. At a point centrally arranged with respect to the circumferential row of rollers, we provide a journal or axle hinge 9 and this extends through a central bearing 10 on a center plate 11. The bearing 10 rests on a thrust bearing or collar 12 arranged on the truck body as shown.

Attached to and resting on this plate 11 is the disk-like turn table 13. On its underside and near the periphery, the turn table is provided with an annulus 14 forming a track which rests on the rollers 7. Incidentally the marginal portion of the plate 11 is provided with gear teeth 15 forming a ring gear.

A pinion 16 meshes with this gear and the pinion is carried by a shaft 17 extending to one side of the truck platform. In fact, the shaft 17 extends through an outer bearing 18 carried by the pointer or index 19, where it is bent to provide a turning crank 20. This is a means for turning the table on the rollers.

The upper side of the turn table is formed somewhat similar to a dial and includes radial marker lines or graduations 21 which radiate from the central axis toward the periphery. The pointer 19 cooperates with these. On the under side is the marginal portion of the turn table and we provide circumferentially spaced keeper sockets 22 which receive the upper end of the spring pressed latch bolt or pin 23.

This is mounted on the platform of the truck to swing thereon as distinguished by the numeral 24. It will be observed that the sockets 23 are in alinement with the graduation top of the turn table.

It is understood that the turn table acts as an accessory on a conventional saw truck, such as is used in stone yards and the like for handling and conditioning large slabs of stone and marble. By placing the slabs on the turn table, and then rotating the tables to the desired point, the latch may be actuated to hold the table in the set position to also enable the stones to be held at a proper point for accurate sawing and conditioning of the stones.

The pointer, graduations, the sockets, and the spring pressed latch all cooperate in enabling the position of the stone to be accurately determined. Thus, this measuring and retaining means is an important factor to be considered. Moreover the slow rolling action produced under the hand rotated shaft and pinion and gearing arrangement, is a notable feature.

Then too, the ease with which the table may be rotated in spite of the heavy load thereon is insured through the medium of the metallic annular tracks, resting on the entire friction rollers, thus insuring proper balancing of the work and the turn table.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure or arrangement, it is not intended to limit the invention beyond the terms of the claim or the requirements of the prior art.

Having thus described our invention, what we claim as new is:—

In a device of the class described, in combination, a portable support comprising a wheel supported platform, a bearing member located thereon and including an upstanding journal forming axle, a plate including a bearing part resting on said first named bearing member and a central hole therein receiving the axle, said plate being provided with marginal gear teeth constituting a ring gear, a circular turn table having its central part fastened on said plate, anti-friction and rolling means interposed between the platform and the turn table, a pointer carried by said platform and including a bearing, a shaft mounted for rotation in said bearing, the shaft having a crank handle at its outer end, a pinion on the inner end of said shaft meshing with said ring gear, the top part of the turn table having radiating lines thereon for cooperating with said pointer and holes in its under face alining with said lines and a spring pressed plunger carried by the platform adapted to engage with any one of said holes for holding a line opposite the pointer.

In testimony whereof we affix our signatures.

WILLIAM ILLINGWORTH.
WILLIAM HENRY ILLINGWORTH.